(12) United States Patent
Wall et al.

(10) Patent No.: US 10,190,717 B1
(45) Date of Patent: Jan. 29, 2019

(54) PULSATION DAMPING FOR DAMPING PULSATIONS UPSTREAM OF A GAS FLOW METER

(71) Applicant: Southwest Research Institute, San Antonio, TX (US)

(72) Inventors: Craig M. Wall, San Antonio, TX (US); Peter M. Lee, Fair Oaks Ranch, TX (US); Nicholas J. Mueschke, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 23 days.

(21) Appl. No.: 15/689,175

(22) Filed: Aug. 29, 2017

(51) Int. Cl.
*F16L 55/052* (2006.01)
*G01F 1/22* (2006.01)

(52) U.S. Cl.
CPC .............. *F16L 55/052* (2013.01); *G01F 1/22* (2013.01)

(58) Field of Classification Search
CPC combination set(s) only.
See application file for complete search history.

(56) References Cited

U.S. PATENT DOCUMENTS 5,562,002 A * 10/1996 Lalin .................... G01F 3/16
                                                                                  73/241
6,138,499 A * 10/2000 Hoede .................. G01N 1/2252
                                                                                 73/23.31

* cited by examiner

*Primary Examiner* — Jewel V Dowtin
(74) *Attorney, Agent, or Firm* — Livingston Law Firm

(57) ABSTRACT

A method of damping pulsations produced by an engine or other driver, so that gas flow can more accurately be measured by a gas flow meter. A damping device is placed between the driver and the flow meter, and has an enclosed volume, an input tube, and an output tube. Particular dimensions of the damping device, namely the volume of the chamber and the diameter and length of the input tube, are calculated to result in a desired damping efficiency.

6 Claims, 2 Drawing Sheets

| QUANTITY | VALUE | UNITS |
|---|---|---|
| CRANK CASE PRESSURE, P0 | 1 | atm |
| CRANK CASE PRESSURE OSCILLATION AMPLITUDE, ΔP0 | 0.075 | atm |
| TEMPERATURE | 500 | °F |
| GAS DENSITY | 0.670 | kg/m$^3$ |
| GAS VISCOSITY | 2.85 x 10$^4$ | pa s |
| SPECIFIC HEAT RATIO | 1.4 | -- |

PULSATION DAMPING FOR DAMPING PULSATIONS UPSTREAM OF A GAS FLOW METER

TECHNICAL FIELD OF THE INVENTION

This invention relates to methods and systems for measuring gas flow rates, and more particularly to improving the accuracy of gas flow meters with pulsation damping.

BACKGROUND OF THE INVENTION

A problem with measuring gas flow rates with flow meters is pulsating flows. Pulsations in a flow line can be caused by various features of the gas flow system, such as a pumping element in the system. Piston, diaphragm, peristaltic and solenoid pumps can all induce significant pressure and flow pulses.

These pulsations have a substantial effect on the accuracy of the flow meter. For better measurement results, pulsation damping methods are used to remove or reduce the pulsations.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a damping method designed to aid volumetric flow rate measurements. As explained below, the damping method includes the use of a damping device upstream of various types of flow meters. In the example of this description, the flow is a gas flow, but the same concepts apply to liquid flow as well.

This method is used to dampen temporal variations in pressure observed from an input line, regardless of the regularity of such fluctuations. The method described below is directed to damping oscillatory pressure input for a certain rotation frequency, for a rotometer used to measure piston ring blow-by gas flow rate of an internal combustion engine. However, the same concepts are applicable to the damping of a single step change in pressure, or any other arbitrary pressure change, jump, or other variation in the input line.

In the example of this description, the flow meter is a rotameter, also referred to as an area meter or pellet gauge. In general, a rotameter comprises a float in an upright tapered tube. The float is lifted to a state of equilibrium between the downward force of gravity on the float and the upward force of the flowing fluid as it passes through an annular space around the float. A measurement scale is linear, due to a differential pressure.

For a rotameter, pulsations in the system being measured can result in oscillations of the float, which can affect measurement accuracy. Damping devices are used to minimize this problem.

One application of a rotameter is to measure the piston ring blow-by gas flow rate of an internal combustion engine. The ability to accurately measure this flow rate is complicated by the fact that the total amount of gas flow to be measured is only a fraction of the total airflow through the engine. The rotameter must be sensitive enough to distinguish the small piston ring blow-by during both stable and unstable piston ring operating modes. The dynamic pressures and flow generated by the reciprocating engine do not provide a steady flow for the rotameter.

As stated in the Background, pressure oscillations can result in significant measurement errors for all types of flow meters. In the specific case of a rotameter, the oscillations prevent the rotameter from distinguishing between relatively low and high blow-by flow rates.

Figure 1:
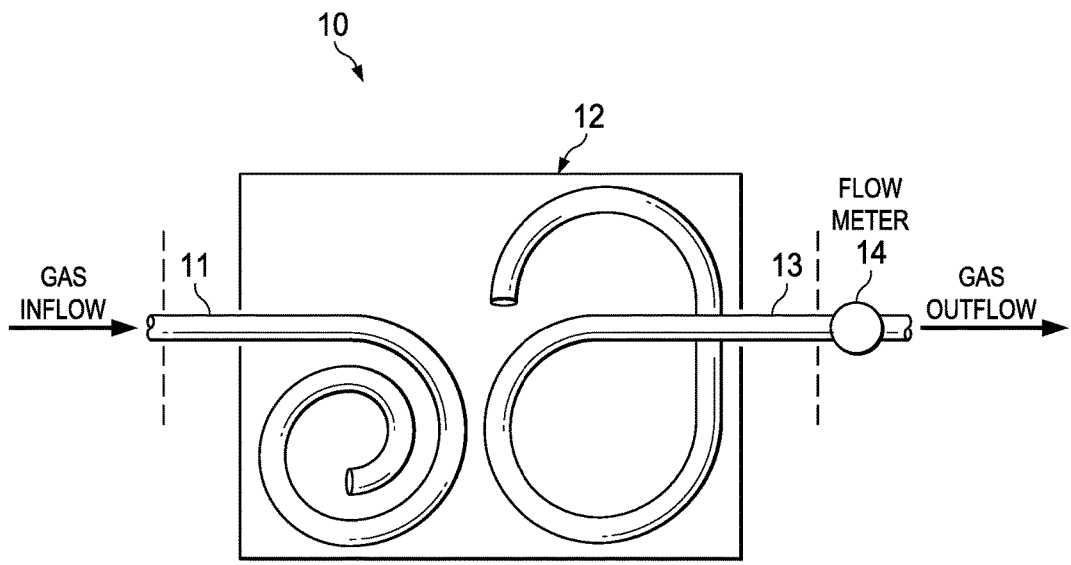
FIG. 1 illustrates a damping device for use with the method of the invention.

FIG. 1 is a schematic illustration of a damping device 10 used for the method of the invention. The inflow and outflow may be from and to any gas flow system. The damping device 10 is installed upstream of a flow meter 14. As stated above, in the example of this description, the flow meter 14 is a rotameter, but damping device 10 is also useful upstream of various other types of flow meters.

The damping device 10 makes use of input tubing 11, an enclosed damping chamber 12, and output tubing 13. The chamber 12 is sealed from fluid input or output, other than by receiving and expelling gas flow via tubing 11 and 13.

Input tube 11 provides fluid communication from a gas inflow line into chamber 12. The exit portion of input tube 11 is coiled within chamber 12. An output tube 13 provides fluid communication from chamber 12 to the flow meter 14. The entry portion of output tube 13 is coiled within chamber 12. Thus, within chamber 12, gas exits input tube 11 and enters output tube 13.

In the example of this description, where the flow meter 14 is used to measure piston ring blow-by flow, the tubing 11 has an inner diameter of 0.44 cm. The input tubing 11 is three meters of pneumatic tubing, and connects the engine crank case to a three-liter chamber 12. The output tubing 13 is a three-meter length of pneumatic tubing, and connects the chamber 12 with flow meter 14.

For the example application of this description, where the input gas flow is likely to be contaminated with oil, the open end of input tubing 11 vents near the bottom of the chamber 12. As a result, any oil residue is likely removed from the air stream before the air stream passes into the output tubing 13. The open end of the output tubing 13 is typically close to the open end of the input tubing 11 as shown in FIG. 1.

Figures 2, 3:
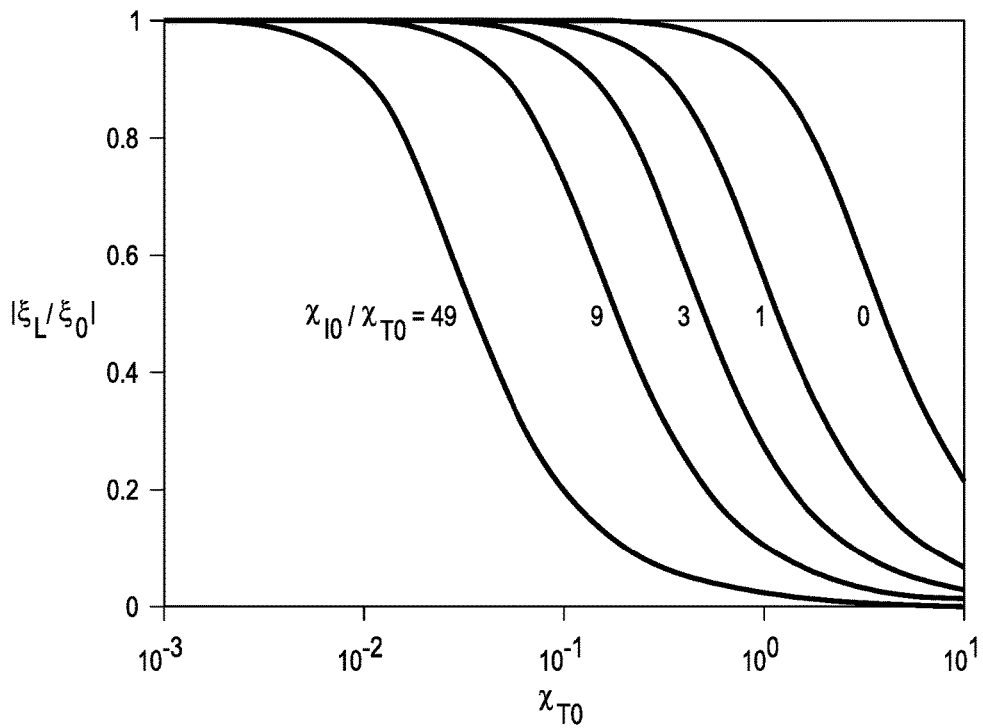
FIG. 2 illustrates various fluid properties and operating conditions used in the method of the invention.
FIG. 3 illustrates damping efficiency as a function of attenuation.

FIG. 2 illustrates the fluid properties and operating conditions of the example method of this description. That is, for the system of FIG. 1, and for application to measurement of the flow rate of piston ring blow-by, FIG. 2 illustrates an example of fluid properties and operating conditions.

These properties can be used to calculate a damping z-factor for the damping device 10 of FIG. 1. For two different engine speeds, 1800 rpm and 3600 rpm:

$$z(1800 \text{ rpm}) = \frac{D^2}{4}\frac{\omega}{v_0} = \frac{(0.44)^2}{4}\frac{188.50}{\left(\frac{2.85 \times 10^{-3}}{0.67 \times 10^{-3}}\right)} = 2.1448,$$

$$z(3600 \text{ rpm}) = \frac{D^2}{4} \frac{\omega}{v_0} = \frac{(0.44)^2}{4} \frac{376.99}{\left(\frac{2.85 \times 10^{-3}}{0.67 \times 10^{-3}}\right)} = 4.2896,$$

where D is the tubing inner diameter, $\omega$ is the angular frequency of the engine ($\omega=2\pi/T$), and $v_0$ is the kinematic viscosity. The damping z-factor delineates between systems that are highly damped ($z \leq 1$), and systems that are minimally damped ($z > 100$).

For the example system, which has a 0.44 cm diameter of tubing 11, and a three-liter volume of chamber 12, the z-factor is on the order of 1. Thus, this system may be evaluated as a highly damped system.

FIG. 3 illustrates the relationship between damping efficiency, $\tilde{\xi}_L/\xi_0$, and an attenuation factor, $\chi_{T0}$.

For highly damped systems, attenuation factors are calculated for an engine operating at 1800 rpm as follows:

$$\chi_{T0} = \frac{32 \mu_0 \omega}{p_0} \left(\frac{L}{D}\right)^2 = \frac{32(2.85 \times 10^{-3})(188.50)}{(1013250)} \left(\frac{300}{.44}\right)^2 = 7.8873,$$

$$\frac{\chi_{I0}}{\chi_{T0}} = \frac{1}{m}\left(\frac{V}{AL}\right) = \frac{1}{1.4}\left(\frac{3000}{0.1521 \times 300}\right) = 46.96$$

In the same manner, attenuation factors are calculated an engine operating at 3600 rpm as follows:

$$\chi_{T0} = \frac{32 \mu_0 \omega}{p_0} \left(\frac{L}{D}\right)^2 = \frac{32(2.85 \times 10^{-3})(376.99)}{(1013250)} \left(\frac{300}{.44}\right)^2 = 15.775,$$

$$\frac{\chi_{I0}}{\chi_{T0}} = \frac{1}{m}\left(\frac{V}{AL}\right) = \frac{1}{1.4}\left(\frac{3000}{0.1521 \times 300}\right) = 46.96.$$

In the above equations, $\mu_0$ is the dynamic viscosity, $p_0$ is the source pressure, L is the tubing length, V is the receiving chamber volume, m is the polytropic expansion exponent, and A is the tubing cross sectional area. For this analysis, the damping system is taken to be an isentropic process ($m=\gamma=1.4$ for air).

A dimensionless pressure oscillation amplitude is defined as:

$$\xi = \frac{p - p_0}{p_0}.$$
$$= \Delta \rho / \rho_0,$$

$\Delta \rho / \rho_0,$ where $\Delta \rho$ is the amplitude of pressure oscillations about the mean pressure $\rho_0$.

The damping of pressure oscillations in the system of FIG. 1 is quantified by the reduction in dimensionless pressure oscillations $\tilde{\xi}_L/\xi_0$, where $\tilde{\xi}_L$ is the maximum dimensionless pressure amplitude at the end of the tubing and within the receiving chamber. A value of $\tilde{\xi}_L/\xi_0 = 1$ indicates that no damping has occurred, and a value of $\tilde{\xi}_L/\xi_0 = 0$ indicates that the system is completely damped.

Damping efficiency is calculated as:

$$\frac{\tilde{\xi}_L}{\xi_0} = \frac{1}{(1+\chi^2)^{1/2}},$$

where $$\chi = \chi_{I0} + \frac{\chi_{T0}}{6^{1/2}}.$$

Using the attenuation factors calculated above, a total damping value may be calculated at 1800 rpm as:

$$\chi = \chi_{I0} + \frac{\chi_{T0}}{6^{1/2}} = 7.8873 \times 46.96 + \frac{7.8873}{6^{1/2}} = 373.608,,$$

and at 3600 rpm as:

$$\chi = \chi_{I0} + \frac{\chi_{T0}}{6^{1/2}} = 15.775 \times 46.96 + \frac{15.775}{6^{1/2}} = 747.234.$$

This results in an overall damping efficiency at 1800 rpm of:

$$\frac{\tilde{\xi}_L}{\xi_0} = \frac{1}{(1+\chi^2)^{1/2}} = \frac{1}{(1+373.608^2)^{1/2}} = 0.268\%,,$$

and an overall damping efficiency at 3600 rpm of:

$$\frac{\tilde{\xi}_L}{\xi_0} = \frac{1}{(1+\chi^2)^{1/2}} = \frac{1}{(1+747.234^2)^{1/2}} = 0.134\%.$$

The above calculations show that the total damping provided by the system of FIG. 1 is sufficient to reduce pressure oscillations at the tubing inlet to under 1% of the pressure oscillations observed in the crank case.

Consistent with the above mathematical description of the system of FIG. 1, it is clear that damping device 10 has certain physical dimensions that can be varied to suit different environments and applications of flow measurement. The key dimensions requiring specification are the diameter and length of tubing 11, and the volume of damping chamber 12. The length of the tubing 11 refers to the length of the tubing between the source of the flow, here an engine, and the damping chamber 12.

Figure 4:
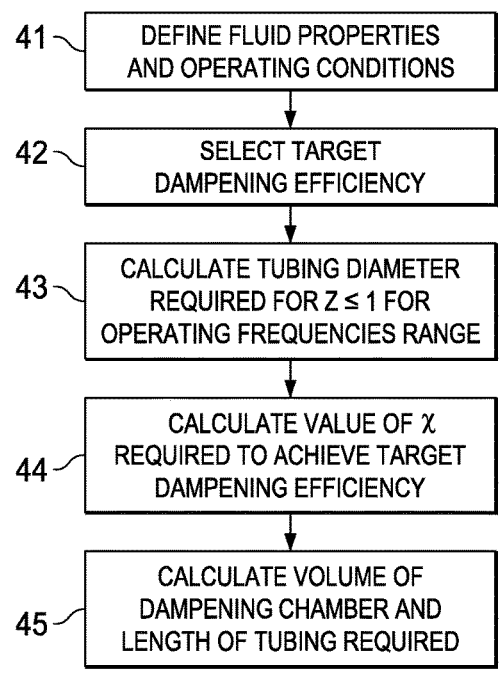
FIG. 4 illustrates a method of configuring the device of FIG. 1 for damping pulsation upstream of a flow meter.

FIG. 4 illustrates a method of determining tubing diameter, tubing length and chamber volume for the damping device 10 of FIG. 1.

Step 41 is determining certain physical conditions of the environment where oscillations must be damped. These conditions can be grouped into fluid properties and operational properties.

As is clear from the equations below, several fluid properties to be determined are: dynamic viscosity $\mu_0$, kinematic viscosity $v_0$, and the polytropic expansion component, m. As is known in the study of fluids, dynamic and kinematic viscosity are related by fluid density, thus, a known value for any two of these fluid properties will determine the third. Also, kinematic viscosity can be determined from dynamic viscosity and density as follows:

$$v_0 = \mu/\rho.$$

Several operational properties to be determined are: angular frequency of the driver of the oscillations (i.e., an engine) $\omega$, source pressure $p_0$, and the amplitude of pressure oscillations $\Delta\rho_0$.

Step 42 is specifying a target damping efficiency $\tilde{\xi}_L/\tilde{\xi}_0$.

In Step 43, given the operating environment parameters and fluid properties, a tubing diameter, D, is calculated to ensure that the final system is classified as a highly-damped system. This is done by selecting a tubing diameter D such that:

$$z = \frac{D^2}{4}\frac{\omega}{v_0} \leq 1$$

for all operating frequencies of interest. In other words, the damping z-factor is expressed as a function of tubing diameter, angular frequency, and viscosity. For devices that require minimal back pressure, i.e. minimal mean friction loss for flow through the device, the largest diameter tubing that satisfies the above criterion should be used.

In Step 44, given the target damping efficiency, the attenuation factor, $\chi$, required to achieve this damping efficiency may be calculated:

$$\chi = \sqrt{\left[\frac{1}{\left(\frac{\tilde{\xi}_L}{\tilde{\xi}_0}\right)}\right]^2 - 1}.$$

In Step 45, given the required attenuation factor, $\chi$, the values for tubing length, L, and receiving chamber volume, V, may be calculated as follows:

$$\chi = \frac{32\mu_0}{p_0}\left(\frac{L}{D}\right)^2\left[\frac{1}{6^{1/2}} + \frac{1}{m}\left(\frac{V}{AL}\right)\right].$$

For any given system, a family of tubing lengths and chamber volumes exists that will satisfy the required attenuation factor. Thus, a secondary criterion is specified in order to fully define the system. The following is a recommended secondary criteria, which expresses a value for the attenuation factor ratio:

$$\chi_{I0}/\chi_{T0} = \frac{1}{m}\left(\frac{V}{AL}\right) = 50$$

However, the value of $\chi_{I0}/\chi_{T0}$ need not be 50 and may vary between 0 and 100.

Given specified values of the attenuation factor and the attenuation factor ratio, a system of equations may be solved for the tubing length and receiving chamber volume:

$$\chi = \frac{32\mu_0}{p_0}\left(\frac{L}{D}\right)^2\left[\frac{\chi_{I0}}{\chi_{T0}} + \frac{1}{6^{1/2}}\right],$$

$$\frac{\chi_{I0}}{\chi_{T0}} = \frac{1}{m}\left(\frac{V}{AL}\right).$$

The first equation above is used to solve for the tubing length, L, of input tubing 11. Then, the second equation is used to determine the volume, V, of chamber 12.

What is claimed is:

1. A method of damping pulsations within a flow line carrying a gas to a flow meter, the pulsations resulting from an engine or other driver, comprising:
   delivering the gas to a damping device comprising an input tube, a chamber, and an output tube, the input tube having a tubing diameter, D, tubing length, L, and cross sectional area, A, and the chamber having a volume, V;
   wherein the chamber receives the gas via the input tube and expels the gas to the flow meter via the output tube, and is otherwise sealed;
   determining the following fluid properties of the gas in the flow line: kinematic viscosity, $v_0$, dynamic viscosity, $\mu_0$, and expansion component, m;
   specifying a target damping efficiency, $\tilde{\xi}_L/\tilde{\xi}_0$;
   determining the following operating conditions of the engine or other driver: angular frequency, $\omega$, and pressure, $p_0$;
   selecting an input tubing diameter, D, by solving the following equation:

$$z = \frac{D^2}{4}\frac{\omega}{v_0} \leq 1;$$

calculating an attenuation factor, $\chi$, required to achieve the target damping efficiency as follows:

$$\chi = \sqrt{\left[\frac{1}{\left(\frac{\tilde{\xi}_L}{\tilde{\xi}_0}\right)}\right]^2 - 1}.$$

and
   calculating a tubing length, L, and chamber volume, V, as follows:

$$\chi = \frac{32\mu_0}{p_0}\left(\frac{L}{D}\right)^2\left[\frac{1}{6^{1/2}} + \frac{1}{m}\left(\frac{V}{AL}\right)\right].$$

2. The method of claim 1, wherein the engine or other driver has more than one angular frequency, and further comprising repeating the steps of selecting a tubing diameter for all angular frequencies of interest.

3. The method of claim 1, wherein the input tubing and output tubing have the same diameter.

4. The method of claim 1, wherein the driver is an internal combustion engine.

5. The method of claim 1, wherein a portion of the input tube or a portion of the output tube, or a portion of both, is coiled within the chamber.

6. The method of claim 1, further comprising specifying a value of $\chi_{I0}/\chi_{T0}$ between 0 and 100.

* * * * *